Figures 1, 3:
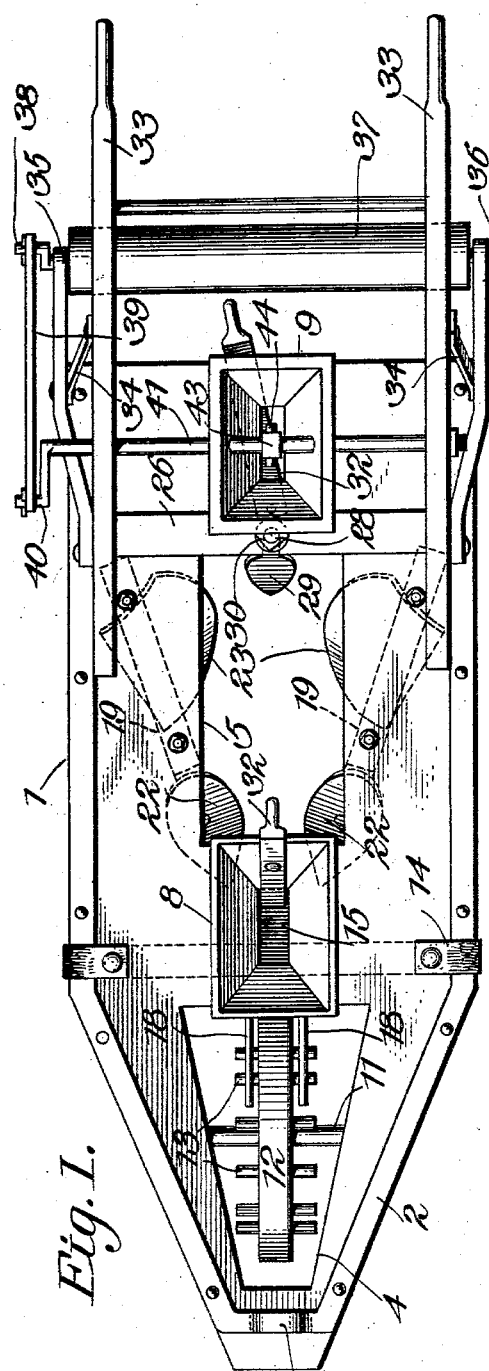

No. 748,843. PATENTED JAN. 5, 1904.
I. C. CLYBURN.
FERTILIZER DISTRIBUTER AND COTTON PLANTER.
APPLICATION FILED JULY 29, 1903.
NO MODEL. 2 SHEETS—SHEET 1.

Witnesses  Ida C. Clyburn, Inventor.
by
Attorneys

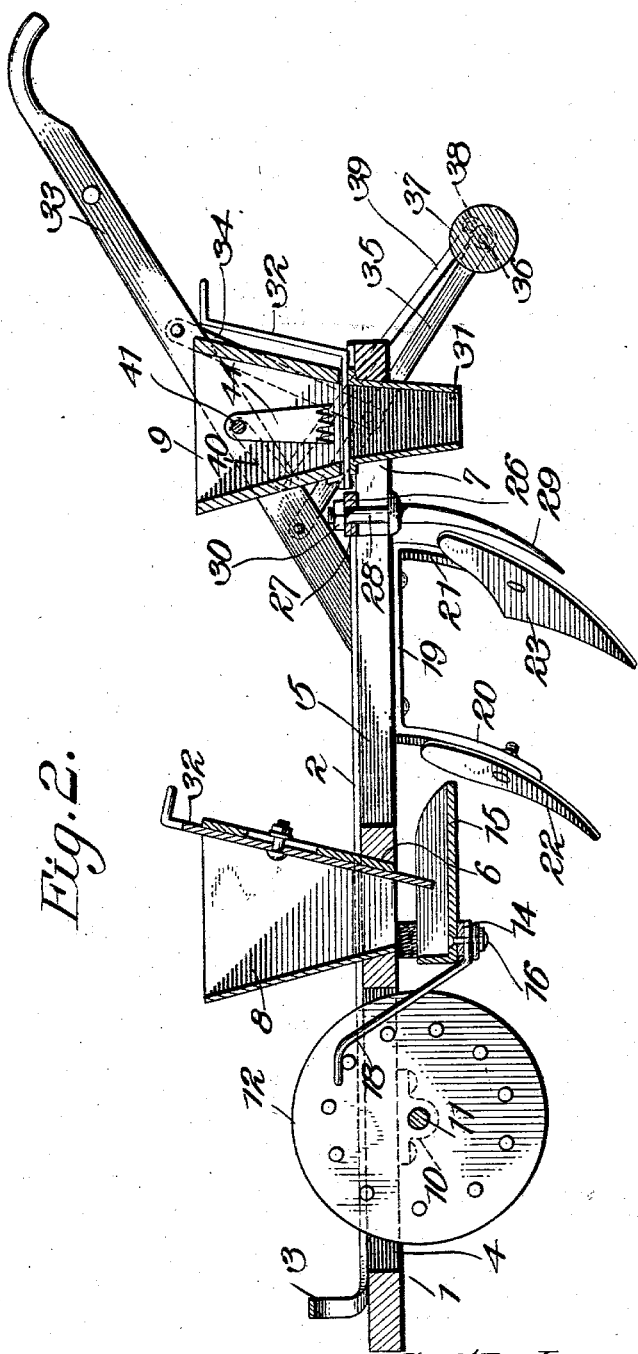

No. 748,843. Patented January 5, 1904.

UNITED STATES PATENT OFFICE.

IDA C. CLYBURN, OF BISHOPVILLE, SOUTH CAROLINA.

FERTILIZER-DISTRIBUTER AND COTTON-PLANTER.

SPECIFICATION forming part of Letters Patent No. 748,843, dated January 5, 1904.

Application filed July 29, 1903. Serial No. 167,445. (No model.)

*To all whom it may concern:*

Be it known that I, IDA C. CLYBURN, a citizen of the United States, residing at Bishopville, in the county of Lee and State of South Carolina, have invented a new and useful Fertilizer-Distributer and Cotton-Planter, of which the following is a specification.

This invention relates to fertilizer-distributers and cotton-planters; and it has for its object to provide a machine in which shall be combined ridging-plows for forming a ridge, fertilizer-distributing means for depositing fertilizing material upon said ridge, turning-plows for forming the cotton-bed, a furrow-opener to open a furrow for the seed, seed-depositing mechanism, and covering mechanism.

With these and other ends in view my invention consists in the improved construction, arrangement, and combination of parts having for their combined object to provide a machine of the class referred to which shall possess superior advantages in point of simplicity, durability, and general efficiency, as will be hereinafter fully described, and particularly pointed out in the claims.

In the accompanying drawings, Figure 1 is a plan view of a machine constructed in accordance with the principles of my invention. Fig. 2 is a longitudinal sectional elevation of the same. Fig. 3 is an inverted plan view of the machine.

Corresponding parts in the several figures are indicated by similar numerals of reference.

The frame of my improved machine (designated 1 in the drawings) is preferably of the contour clearly seen in Fig. 1, although it is not necessary to limit it to the exact shape shown. Upon the upper side of said frame, along the edges thereof, is secured a metallic strip 2, converging at the front end, where it forms a loop 3, which may serve for the attachment of the draft. The frame is provided with an approximately triangular front opening 4, an approximately rectangular central opening 5, and with two slots (designated, respectively, 6 and 7) for connection with the hoppers 8 and 9, the former of which is preferably made of sheet metal and is for the reception and distribution of fertilizing material, while the hopper 9 is preferably made of wood and is for the reception and distribution of cotton-seed. Bearings 10 upon the under side of the frame support an axle 11, upon which is mounted a drive-wheel 12, having a plurality of laterally-extending tappets 13. A flexible band or strap 14, the ends of which are suitably secured to the sides of the frame under the fertilizing-hopper, supports a scoop 15, having a downwardly-extending headed lug 16, which engages a loop having forwardly and upwardly extending arms 18, which are disposed in the path of the tappets 13 upon the wheel 12, which latter will thus when rotated impart a vibratory movement to the scoop 15, which being disposed below the slot 6 receives a supply of fertilizing material from the hopper 8, and which being thus vibrated will serve to distribute the said fertilizing material evenly upon the ground.

Upon the under side of the frame 1 and adjacent to the rectangular opening 5 are secured a pair of forwardly-converging straps or plates 19, the front and rear ends of which are bent downwardly to form shanks or standards 20 and 21, which are vertically slotted for the adjustable connection therewith of the ridging-plows 22 and the turning-plows 23. The ridging-plows being disposed in front will serve to form a ridge upon which the fertilizing material is deposited by the suspended scoop, hereinbefore mentioned. The turning-plows following the ridging-plows will throw up enough dirt from both sides to form the cotton-bed. The slots 24 in the several standards will enable the plow-blades connected therewith to be adjusted vertically to any extent that may be desirable and necessary. Upon the upper side of the frame at the rear end of the opening 5 is secured a cross-bar 26, having an opening 27, in which the shank 28 of the furrow-opener 29 is vertically adjustable by means of a screw-thread at its upper end, having a nut 30. This furrow-opener is disposed about centrally between the turning-plows, so as to cut into the ridge or bed formed by the latter a furrow of sufficient width and depth to receive the seeds. The latter are conveyed to the furrow through a seed-tube 31, which communicates with the hopper 9, containing the cotton-seeds. Said hopper 9, as well as the hopper 8, is provided with gage-slides, as 32, through which the quantity of material permitted to escape from said hoppers may be regulated.

The handles of the machine, which are designated 33, are securely connected at the lower ends with the upper side of the frame, and braces 34 are suitably arranged to support said handles. The latter are furthermore sustained by means of auxiliary braces 35, which are extended rearwardly and downwardly, so as to form bearings for a shaft 36, carrying the covering-roller 37. The shaft 36 is provided at one end with a crank 38, which is connected by means of a pitman 39 with a crank 40 upon a shaft 41, which has its bearings in the handles of the machine and also in the sides of the cotton-seed box or hopper 9. Suitably secured upon the said shaft within the cotton-seed box or hopper is a sleeve 43, having a downwardly-extending agitating-finger 44, the lower end of which may be toothed or serrated in the manner usual in this class of devices.

From the foregoing description, taken in connection with the drawings hereto annexed, the operation and advantages of my invention will be readily understood by those skilled in the art to which it appertains. Fertilizing material and cotton-seed are placed in the receiving-hoppers, and draft having been attached to the machine the latter is propelled over the ground in the usual manner. The wheel 12, which engages the surface of the ground, is thereby rotated, and the tappets upon said wheel will vibrate the suspended scoop 15, into which, by the vibrating movement of the machine, the fertilizing material is constantly being fed from the hopper 8, the escape, opening of which may be gaged as to size by means of the gaging-slide 32. The ridging-plows of the machine project forwardly somewhat under the discharge end of the scoop 15, and the earth will thus be thoroughly commingled with the fertilizing material deposited thereon, the tendency being to throw the said fertilizing material toward the upper edge of the ridge. The turning-plows, which now follow, will throw an additional quantity of dirt upon the sides of the ridge, and the furrow-opener, which follows directly behind the turning-plows, will cut in the top of said ridge or bed a furrow, which will be located at the exact point where the greater quantity of the fertilizing material is deposited. Into this groove or furrow the cotton-seed is now dropped from the hopper 9 and through the spout 31, the seed being forced through the slot 7 and through the seed-tube by means of the agitator within the box, to which motion is transmitted from the covering-roller in the manner which has been herein described—that is to say, by means of the cranks upon the ends of the shafts extending, respectively, through the covering-roller and through the seed-box, the latter shaft 41 being additionally supported in the handles of the device.

It will be seen from the foregoing that while my improved fertilizer and cotton-seed distributer is extremely simple as to the construction thereof it will perform the work required with less outlay of time and labor than where separate machines are employed for the several purposes, which are successfully accomplished by the single operation of my improved apparatus.

Having thus described my invention, I claim—

1. In a machine of the class described, a frame, a ground-engaging wheel having laterally-extending tappets, a hopper supported upon said frame, a flexible strap secured to the sides of the frame and extended loosely below the same, a scoop having a downwardly-extending stud constituting a button engaging said flexible strap, and a loop engaging said button below said flexible strap and having forwardly-extending arms disposed in the path of the tappets upon the ground-engaging wheel.

2. In a machine of the class described, a frame, forwardly-converging straps upon the under side of said frame, said straps being provided at their front and rear ends with integral downward extensions forming standards, ridging-plows connected with the front standards, turning-plows connected with the rear standards and adapted to bed the soil upon the ridge formed by the plows, means for dropping fertilizing material in front of the ridging-plows, and a furrow-opener supported in rear of and between the turning-plows.

In testimony that I claim the foregoing as my own I have hereto affixed my signature in the presence of two witnesses.

IDA C. CLYBURN.

Witnesses:
J. MANLY SMITH,
S. A. DURANT.